Nov. 6, 1934.  E. K. BAKER  1,979,522

MOTOR VEHICLE

Filed Dec. 4, 1933

Inventor:
Erle K. Baker

Patented Nov. 6, 1934

1,979,522

UNITED STATES PATENT OFFICE 1,979,522

MOTOR VEHICLE

Erle K. Baker, Detroit, Mich., assignor to Baker Axle Company, Cleveland, Ohio, a corporation of Ohio Application December 4, 1933, Serial No. 700,775

9 Claims. (Cl. 267—19)

My invention relates to improvements in motor vehicles, as described in the present specification and more particularly pointed out in the appended claims that form a part of the same.

The invention consists essentially in the novel arrangement and construction of parts, whereby end axle members positively connected to resilient chassis frame supports are inter-connected by intermediate members movable in parallel relation one to the other.

One of the objects of my invention is to provide a front axle construction that permits for independent movement of one front wheel with respect to the other with possible compensating movement of the other front wheel, allowing the frame and body to remain in a normal position thereby improving the steering of the car as well as the ride of same.

Another object of my invention is to provide an axle construction which flexes itself automatically to permit proper positioning of the front wheels on uneven road surfaces and preventing distortion in the frame and body. This absence of frame and body distortion allows the frame and body to remain in a more or less normal plane eliminating the twisting and tossing of frame and body carrying the occupants, resulting in a much improved ride.

Another object of my invention is to provide a front axle construction that will maintain the front wheels always in parallel relation one to the other thereby guarding against scuffing of the tires on the road and elimination of "squeal" and tire wear due to such scuffing, which is an improvement over a rigid axle construction.

Another object of the invention is to have the torsional force of the vehicle suspension springs largely assist in maintaining the axle and wheels in normal position.

A still further object of my invention is to provide an axle construction that automatically banks the frame and body on a turn in the road thereby giving much greater stability and roadability to the car.

Further objects and advantages will be apparent from the drawing, as more particularly pointed out in the specification in which Fig. 1 is a front elevation of the axle construction with the supported frame members shown in section.

Referring now to the drawing, like numerals in the several figures refer to similar parts.

Figure 1:
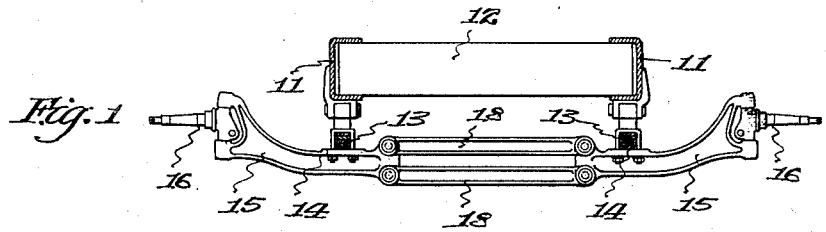
Figure 2:
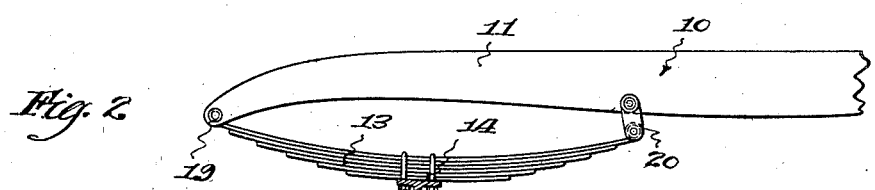
Fig. 2 is a side elevation of the front end of the frame showing a front spring and its relation with the axle.
Figure 4:
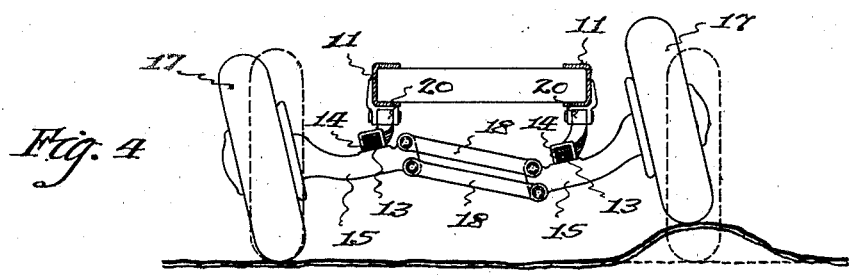
Fig. 4 is a diagrammatic front view of the axle and frame members showing the position assumed where one front wheel is in a raised position—the rear wheels being shown in dotted lines.
Figure 5:
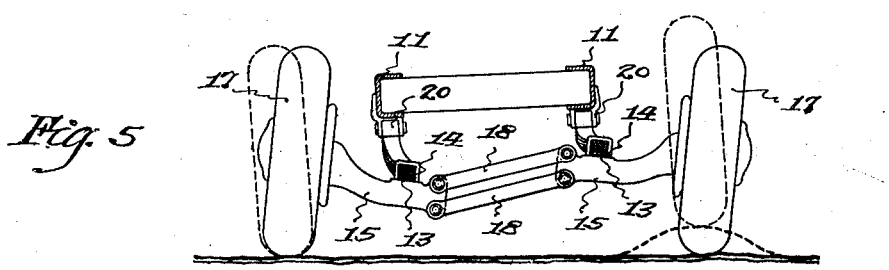
Fig. 5 is a diagrammatic front view of the axle and frame members showing the position assumed when one of the rear wheels is in a raised position, as shown by the dotted lines.

In Figs. 1 and 2, 10 is a vehicle chassis frame comprising the side members 11—11 and cross members 12, one of which is shown in Fig. 1. The chassis frame 10 is shown provided with semi-elliptic springs 13 at the front secured in the regular manner to the spring pads 14 formed on the end sections 15 of the front axle. Each end section is provided with the customary front wheel spindle 16 for mounting the front wheels 17. The axle end sections 15 at their inner ends, as shown, are pivotally interconnected by parallel link bars 18, which complete the cross front axle construction having the end sections or members 15 so connected by the parallel link bars 18 that each is free to move into position as the road surface may demand without disturbing the normal position of the frame and body, as is best shown in Figs. 4 and 5.

At the same time this independent movement of the front wheels largely overcomes the synchronous and harmonic build up effort of front wheel action that occurs particularly in high speed driving with low air pressure tires. It is this build up effort that works into "tramping" and "shimmying", but the hinged action of the axle ends and wheels eliminates this build up action, as the effort of one wheel is not transmitted to the opposite wheel. The elimination of this tramping and shimmying tendency permits the car to be steered with much greater safety than where such conditions are present.

Though the front springs 13, as shown, are the semi-elliptic type and are connected to the frame members at 19 and 20 in a conventional manner, it must be understood that other types of spring support for the frame may be used to advantage without departing from the spirit of the invention however.

Any form of leaf springs connected to the vehicle frame and the end axle members so that they must be twisted when one moves out of phase with the other has the particular advantage of utilizing not only the normal flexing action to hold the parts in proper relation one to the other, but the added stabilizing effect of the torsional resistance of the leaf spring steel to hold the axle members and wheels to which they are directly and securely clamped to a normal position.

Figure 3:
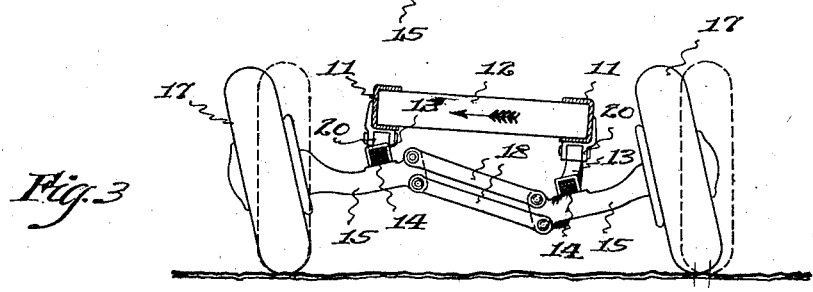
Fig. 3 is a diagrammatic front view of the axle and frame members showing the banking position of the axle and front wheels when rounding a curve, the rear wheels being shown in dotted lines.

Referring now to Fig. 3, this diagrammatic view is looking at the axle from the front—the rear wheels being shown in dotted lines—and shows the position of the wheels and axle as the car is making a left hand curve or turn.

When a car is going into a curve the weight of the car mass tries to follow a straight ahead course and in turning the front wheels the forces set up by the mass in the direction of the arrow lays the wheels 17 over, as shown, and in doing so the tilt given the axle member 15, on the outer side of the turn, raises the spring pad 14 on that side and lowers the spring pad on the axle end at the inside of the curve giving a banking angle on the frame and body members, thereby greatly lessening the disposition of the frame and body mass to roll the car to the outer side of the curve. Naturally the weight of the car in taking a curve compresses the outside spring and relieves the inside spring, but the raising and lowering of the spring pad positions on the axle members, as shown, more than offsets the compressed and relieved positions of the springs. The wheels and axle members are able to take the tilting positions as shown with reference to this figure, due to the parallel connecting bars 18 which as hereinbefore described are pivotally connected to the axle members.

Referring now to Fig. 4, the axle and front wheels are shown in a position they will assume when one of the front wheels is lifted by an elevation in the road surface. This figure clearly illustrates how twist and distortion is eliminated from the frame and body. The rear wheels shown in dotted lines are in a normal horizontal position on the road and one front wheel 17 is in an elevated position, but the frame and body remain in a normal horizontal position due to the automatic compensating movement of the front axle end members whereby the spring on the lower wheel is raised and the spring on the elevated wheel is lowered.

As the car moves forward and the raised front wheel comes back to a level portion of the road, the front axle assumes its normal horizontal position with reference to the road, due to the torsional effort of the springs, without any change in the horizontal position of the frame and body.

Referring now to Fig. 5 which shows one of the rear wheels in dotted lines, in a raised position, due to an elevation on the road surface, the frame supporting the body is shown tilted to a much lesser degree than the position that would be assumed by the rear axle itself as the rear springs are customarily made more resilient than those on the front axle and in practice will only cause the front axle to flex to a limited extent sufficient to relieve any strain on the frame.

It has always been a problem in automobile frame and body design to provide a frame rigid enough to withstand the twisting and distortion brought about by the wheels moving over uneven road surfaces. Such twisting and distortion demands unnecessarily heavy, rigid, and expensive frames and even then results in squeaks and rattles in the doors and body parts.

It can be seen from the foregoing description that I have provided an axle construction which is simple and of low cost, as compared to others of the independent wheel suspension type and one that will require practically no attention in service. The construction shown and described is readily adaptable to automobile chassis design as used with a conventional rigid axle and would means very little in the way of expense for the adoption of this axle construction.

While this invention may suggest other constructions to one skilled in the art I do not wish to be limited except as pointed out in the appended claims.

I claim as my invention:—

1. In combination with a vehicle frame and a pair of wheels, an axle comprising two end axle sections each having inner terminal portions forming the upright sides of a parallel motion mechanism, said sides being fixed transversely with respect to the wheels, two transverse members pivotally connected one above the other to and extending between said portions and completing said parallel motion mechanism, a chassis frame, longitudinal leaf spring units connected to the frame and rigidly attached to said axle sections outside said pivotal connections for supporting the frame thereon, said springs being adapted through their torsional effort to hold the sections normally in alinement.

2. In combination with a vehicle frame, a pair of transversely spaced wheels, mechanism for permitting movements of the wheels relative to said frame while maintaining them substantially parallel, comprising end axle sections connected to the wheels, substantially parallel transverse members pivoted to the inner ends of said sections and free of the vehicle frame intermediate said pivots and forming with said ends a parallel motion mechanism, said inner ends being transversely fixed with respect to said wheels, springs for supporting the vehicle frame and rigidly secured to said axle sections at points outside said pivots and torsionally effective to resist but not prevent tilt of said wheels under predetermined operating conditions.

3. In a motor vehicle, a frame, an articulated axle connected therewith and movable relative thereto, said axle comprising spaced apart end axle sections connected at their outer ends with the wheels of the vehicle, a plurality of substantially parallel transverse members pivotally connected with the adjacent inner ends of said sections and forming therewith a parallel motion mechanism free to move bodily with respect to the vehicle frame, and torsionally effective springs between said frame and axle and rigidly secured to said axle sections outside said pivotal connections and adapted to support the frame and to control movement of said parallel motion mechanism.

4. In a motor vehicle, a frame, a plurality of stub axles, rotatable wheels pivotally mounted on the outer ends of said stub axles, a plurality of substantially parallel transverse members pivotally connected to the inner ends of said stub axles and forming a parallel motion mechanism therewith, said parallel motion mechanism permitting angular movement of one stub axle relative to the frame by bodily movement of the parallel motion mechanism and a resultant complementary movement of the other stub axle thereby increasing the centripetal forces tending to balance centrifugal forces arising from curvilinear movement of the vehicle, and torsionally effective springs between the said axle and said frame and rigidly secured to said stub axles outside the parallel motion mechanism and effective to support the frame on the axle and directly resist said angular movements of the stub axles.

5. In a motor vehicle, a frame, a plurality of stub axles, rotatable wheels mounted on the outer ends of said stub axles, a plurality of swinging transverse members pivotally connected to the inner ends of said stub axles and forming therewith a parallel motion mechanism, said parallel motion mechanism permitting angular movement of one stub axle relative to the frame by bodily movement of the parallel motion mechanism and a resultant complementary movement of the other stub axle thereby increasing the centripetal forces tending to balance centrifugal forces arising from curvilinear travel of the vehicle, the said wheels being maintained at all times in substantially parallel relation to each other but at varying angular positions relative to the road surface, and torsionally effective spring means rigidly secured to the stub axles and effective to support the frame on the axles, to maintain said axles normally in alinement, and to resist yieldably said angular movement of the axles.

6. In a motor vehicle, a frame, a pair of end axle sections, transversely spaced wheels mounted on the outer ends of said axles, a plurality of substantially parallel transverse members pivoted to the inner ends of said sections and forming with said ends a parallel motion mechanism, torsionally effective spring means rigidly secured to said axle sections and supporting the frame on said axle sections at points outside said pivots whereby bodily movement of said parallel motion mechanism and also angular and vertical movement of the axle sections relative to the frame are permitted, said parallel transverse members and the points of support of the spring means on said axle sections lying normally below the transverse axis of the wheels.

7. In a motor vehicle, a frame, a pair of end axle sections, transversely spaced wheels mounted on the outer ends of said axles, a plurality of substantially parallel transverse members pivoted to the inner ends of said sections and forming with said ends a parallel motion mechanism, torsionally effective spring means rigidly secured to said axle sections and supporting the frame on said axle sections at points outside said pivots whereby bodily movement of said parallel motion mechanism and also angular and vertical movement of the axle sections relative to the frame are permitted, said parallel motion mechanism lying normally below the transverse axis of the wheels.

8. In combination with a vehicle frame and a pair of wheels, an axle comprising two end axle sections each having inner terminal portions forming the upright sides of a parallel motion mechanism, the said sides being fixed transversely with respect to the wheels, two transverse members pivotally connected one above the other to and extending between said portions and completing said parallel motion mechanism, a chassis frame, longitudinal leaf spring units connected to the frame and secured to said axle sections in such a manner as to provide both a flexure and torsion of said leaf spring units under different relative displacement of said end axle sections and wheels, said torsion of said springs acting to maintain, under normal load, said end axle sections in alignment.

9. In a motor vehicle, a frame, an articulated axle connected therewith and movable relative thereto, said axle comprising spaced apart end axle sections connected at their outer ends with the wheels of the vehicle, a plurality of substantially parallel transverse members pivotally connected with the adjacent inner ends of said sections and forming therewith a parallel motion mechanism free to move bodily with respect to the vehicle frame, and flexible torsionally effective springs connected to the frame and secured to said axle sections in such a manner as to provide both a flexure and a torsion of said spring units under different relative displacement of said end axle sections and wheels, said torsion of said springs acting to maintain, under normal load, said end axle sections in alignment.

ERLE K. BAKER.